United States Patent [19]

Sachser

[11] 4,250,593
[45] Feb. 17, 1981

[54] CASTER WHEEL FOR A CARRYING APPARATUS SUCH AS A SHOPPING CART AND THE LIKE

[75] Inventor: Herbert Sachser, Wermelskirchen, Fed. Rep. of Germany

[73] Assignee: Albert Schulte Söhne KG, Wermelskirchen, Fed. Rep. of Germany

[21] Appl. No.: 101,055

[22] Filed: Dec. 6, 1979

[30] Foreign Application Priority Data

Mar. 17, 1979 [DE] Fed. Rep. of Germany ....... 2910555

[51] Int. Cl.³ .................... A47B 91/00; B60T 1/14
[52] U.S. Cl. ........................... 16/45; 188/5; 188/32
[58] Field of Search .............. 16/45, 35 R, 46, 47, 16/35 D, 18; 188/5, 32

[56] References Cited

U.S. PATENT DOCUMENTS

| 3,608,693 | 9/1971 | Stosberg et al. | 16/35 R |
| 3,751,757 | 8/1973 | Stosberg et al. | 16/35 R |
| 3,899,801 | 8/1975 | Carrier | 16/45 |

Primary Examiner—Doris L. Troutman
Attorney, Agent, or Firm—Michael J. Striker

[57] ABSTRACT

The caster wheel includes a swivel housing connected to a transportation apparatus such as a shopping cart and supporting a transverse shaft and a downwardly directed braking bracket terminated with a transverse braking shoe. Two separate wheel discs are respectively supported for rotation on the shaft and are slidably interconnected along their periphery by snap-in annular grooves and tongues. Each wheel disc is provided with a radially directed guiding ring which is adapted for engaging a guiding groove on a conveyor belt.

8 Claims, 2 Drawing Figures

CASTER WHEEL FOR A CARRYING APPARATUS SUCH AS A SHOPPING CART AND THE LIKE

BACKGROUND OF THE INVENTION

This invention relates generally to transport utensils, and more particularly it relates to a caster wheel for transport apparatus such as a shopping cart or the like which is adapted for being advanced on a sloping conveyor belt having longitudinally directed guiding grooves and ribs on its upper surface. The caster wheel is of the type which includes a swivel housing with a projecting axle upon which are independently supported for rotation two wheel discs adapted for engaging the longitudinal grooves on the conveyor belt. The swivel housing further supports a braking bracket having a braking shoe which upon engagement of the rolling surface of the wheel discs with the conveyor belt grooves abuts against the longitudinal ribs of the belt.

In multi-level supermarkets there are used conveyor belts for conveying carrying apparatuses particularly the shopping carts from one floor to another floor. The upper surface of the conveyor belt is provided with longitudinal ribs defining corresponding grooves therebetween. To prevent the shopping cart from rolling during its transport on the inclined conveyor belt the periphery of its rollers and caster wheels is provided with radially projecting rings which engage the grooves in the conveyor belt. These guiding rings upon entering the grooves lower the position of the center axis of the wheel relative to the conveyor belt and the braking shoe connected to the wheel housing comes to rest on the upper surface of the conveyor belt before the periphery of the guiding rings contact the bottom of the grooves. As a result, the braking member upon placing the shopping carts on the conveyor belt makes the wheels ineffective. In order to facilitate the entry of the guiding rings into the grooves of the conveyor belt, the guiding rings by themselves are relatively narrow and consequently the specific pressure of the point of contact of the guiding rings with the floor is relatively high especially when taking the curves and when placing the carts on the conveyor belt. For this reason the guiding rings on the wheel of the cart are subject to excessive wear and already after a relatively short time of usage the wheels of the cart have to be exchanged in order to insure a flawless operation of the cart. The wear on the wheels and caster wheels caused by driving the shipping carts on a curved path can be substantially reduced by employing rollers instead of wheels as described for example in the German Pat. No. 2,656,322. The caster wheel described in this patent includes two wheel discs supported independently from one another for rotation on an axle whereby the wheel discs are arranged on opposite faces of a swivel housing arranged between the discs. The braking arm is substantially an extension of the swivel housing and supports on its lower end a braking shoe. The wheel discs themselves are supported on the central axis only and spaced apart by the housing whereby the rims of the disc-shaped wheel discs are completely free. Due to the play resulting from the wear in the bearings of respective wheel discs it may happen that the distance between the wheel discs in the range of their face surfaces either increases or diminishes so that the marginal zones of respective wheel discs no longer fit into the grooves of the conveyor belt. As a consequence a reliable transport of shopping carts provided with the afore-described prior art caster wheels is no longer insured. In addition, the swivel housing of this prior art caster wheel represents a special structure of a split wheel which necessitates in the case of the changeover from conventional shopping carts to those suitable for being transported on the inclined conveyor belt the changeover not only of the running wheel but of the entire caster wheel assembly.

SUMMARY OF THE INVENTION

It is therefore a general object of the present invention to overcome the aforementioned disadvantages.

More particularly, it is an object of the present invention to provide an improved caster wheel assembly for transportation carriages, especially for shopping carts adapted for being conveyed on an inclined conveyor belt having in its surface longitudinal guiding grooves in which the differential movement of guiding rings provided on the running surface of the caster wheel is made possible whereby the distance of the guiding rings on the caster wheel which is required for a reliable engagement of the wheel with the guiding grooves on the conveyor belt, is always maintained.

In keeping with these objects, and others which will become apparent hereafter, one feature of the invention resides, in a caster wheel of the aforedescribed type, in the provision of two wheel discs each being provided with at least one radial guiding ring and being slidably interlocked into a closed structural unit forming a torroidal caster wheel. By virtue of this slidable interlocking of the two wheel discs into a single wheel, a radial sections of which are nevertheless independently rotatable has the advantage that during turns of the shipping cart no increased wear of the caster wheel takes place. In addition, due to the locking engagement of the two wheel discs, the clearance of the guiding rings remains always unchanged. An additional advantage of the caster wheel of this advantage is the ease of its assembly from the two wheel discs. Furthermore, the danger of spoiling the bearings is by the creation of a compact caster wheel unit effectively avoided inasmuch as no fibers can be drawn into the area of the wheel bearings. Finally, the caster wheel of this invention because of its compact structure permits the use of standard swivel housing forks so that when changing-over normal shipping carts to carts adapted for being transported on a grooved conveyor belt it is sufficient to exchange only the wheel and not the entire caster wheel assembly.

According to another feature of this invention, both wheel discs have a disc-like configuration resulting when assembled into a hollow torroidal caster wheel. With advantage the two dish-shaped wheel discs are connected one to another in such a manner that one disc has in its axial region a flanged projection which is complementary to a projection on the other disc whereby the rim of each disc is provided with interlocking grooves and ribs which snap into one another and lock the disc into a single structural unit.

According to another feature of this invention, the radially directed guiding ring on the circumference of each disc is manufactured as a separate component part which is additionally embedded in the disc. In this manner the wheel disc proper can be economically manufactured of material which conforms to static and dynamic requirements for the wheel whereas the guiding ring is manufactured of an abrasion and wear-resistant plastic material, such as polyurethane, for example. In the case when the wheel discs are also manufactured of an inexpensive plastic material, it is advantageous when the guiding ring is attached to the disc by injection die casting.

In order to avoid differences in locking and supporting forces acting on the caster wheel, the interlocking grooves and ribs are situated with advantage at the center of the periphery of the wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figures 1, 2:
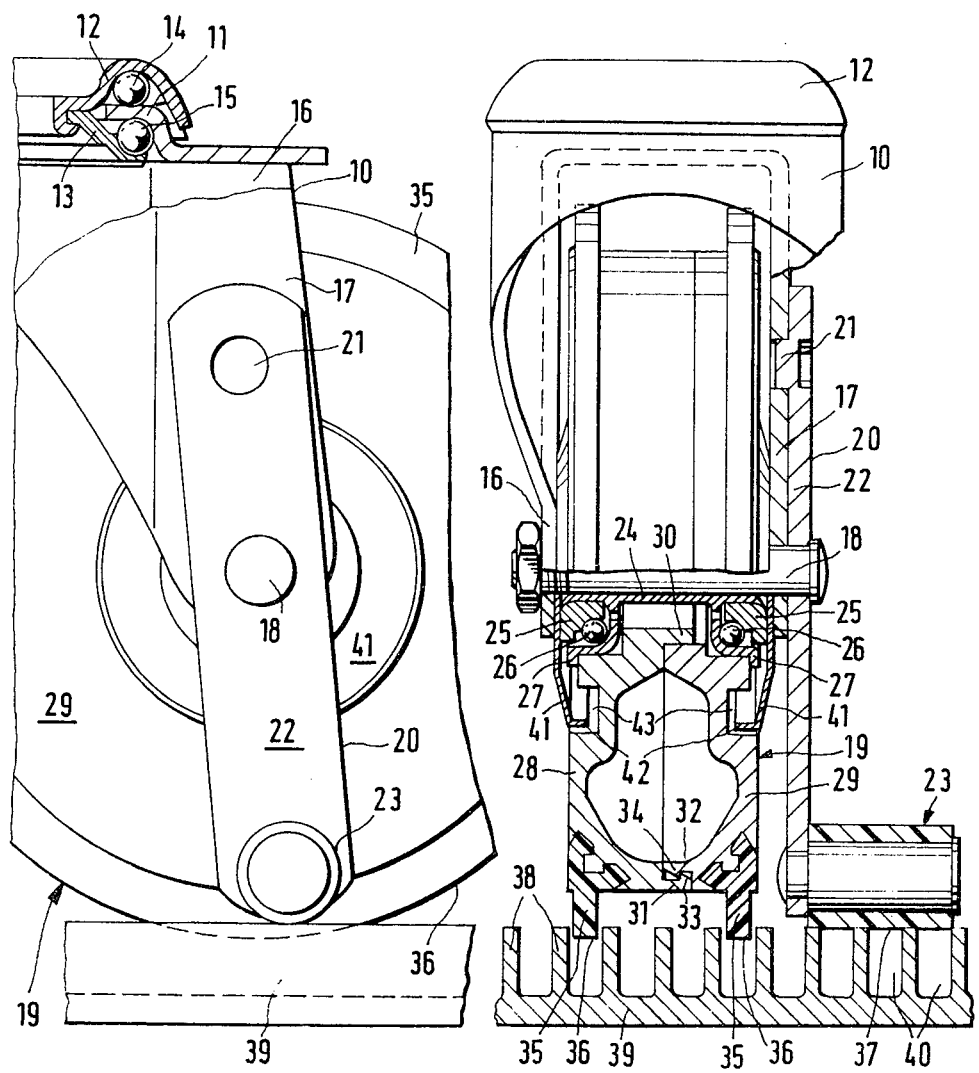
FIG. 1 is a cut-away side view, partly in section of a caster wheel of this invention, resting on a grooved conveyor belt.
FIG. 2 is a front view, partly in section, of a caster wheel of FIG. 1.

The caster wheel of this invention includes a fork-shaped swivel housing 10 having on its top and a bent bearing flange 11 projecting between an upper bearing shell 12 and a lower bearing shell 13. Two series of bearing balls 14 and 15 are arranged between the flange 11 and respective bearing shells 12 and 13 so that the swivel housing 10 is rotatable with respect to the bearing shells. The arms 16 and 17 of the housing 10 support a transverse axle 18 which supports for rotation between the two arms 16 and 17 a caster wheel 19. The axle 18 also supports an upright strap 22 of a braking member 20 which at its upper end is secured to the housing arm 17 by a pin 21. The lower end of braking strap 22 is provided with braking leg 23 which is positioned slightly above the rolling surface 36 of the guiding rings 35 of the wheel 19. The axle 18 in the wrench between the housing arms 16 and 17 is surrounded by a sleeve 24 which at both ends thereof is provided with bearing cones 25 each having a raceway for a series of bearing balls 26. The bearing balls 26 are held in position by two bearing shells 27 mounted in a recess in the axial region of the caster wheel 19 and forming together with cones 25 two ball bearings in which the wheel 19 is rotatably supported. According to this invention, the caster wheel 19 is assembled of two wheel discs 28 and 29 each having in its axial region a tubular inwardly directed projection which on its outer side defines the aforementioned recess for the bearing shells 27. Both wheel discs 28 and 29 have a dish-like shape the rim of which is formed with annular locking grooves and tongues which lockingly snap into one another and together with the complementary central projections 30 hold the discs 28 and 29 as a single caster wheel having a hollow torroidal configuration. In the illustrated embodiment, the rear disc 29 is provided at the center with a tubular projection 30 which engages a snugly fitting complementary projection on the other wheel disc 28 so that both wheel discs reinforce each other not only in the radial direction by the snap-in of a peripheral groove and tongue but also in the axial direction by the engaged center projections. The interlocking annular grooves 31 and 32 in rim portions of respective wheel discs 28 and 29, as mentioned above, snap in tightly fitting tongues 33 and 34 of the discs. The cross-sectional outlines of the grooves and tongues slightly overlap each other to such an extent that by pressing the tongues into the opposite grooves the walls of the latter can elastically yield and permit the entry of the tongue and finally resiliently interlock the latter in their final locking position. As described before, each of the wheel discs 28 and 29 is provided with a radially projecting guiding ring 35 having a relatively narrow rolling top surface 36 which with a certain play is engageable with the grooves 40 between the longitudinal ribs 38 on the conveyor belt 39. The radial distance of the rolling surface 36 of the rings 35 from the central axis exceeds the radial distance of the lower edge 37 of the braking shoe 23 and consequently when guiding rings 35 dip into the grooves 40 on the conveyor belt, the lower edge of the braking shoe 23 rests on the conveyor belt 39. It is to be understood that the axial dimensions of respective wheel discs 28 and 29 and thus the axial distance of the guide rings 35 on the assembled caster wheel 19 has to be so dimensioned with respect to the pattern of the longitudinal guiding grooves 40 on the conveyor belt as to match the assigned guiding grooves. In the shown example the guiding rings 35 of the caster wheel are located in close proximity to the end faces of respective wheel discs 28 and 29. The corner region between the end face and the peripheral surface of each wheel disc is in this example formed with an annular recess serving for anchoring the wheel discs 35 made of a wear-resistant plastic material applied on the discs preferably by an injection dye-casting process. The bearing region of the assembled caster wheel 19 is protected by cup-shaped cover plates 41 with axially bent collar 42 projecting into corresponding recesses 43 in respective wheel discs 28 and 29 to form with the latter a labyrinth-like seal against contamination from the outside.

When the rolling surfaces 26 of guiding rings 35 rigidly embedded in respective wheel discs 28 and 29 are moved in a straight direction on a flat floor, both discs 28 and 29 have the same circumferential speed and thus the same rotational rate. When the transportation apparatus provided with the caster wheel of this invention is moved along a curved path, the outer wheel disc travels on a longer path than the inner wheel disc, and consequently the circumferential speed of the outer disc exceeds that of the inner disc. Inasmuch as both wheel discs 28 and 29 are fastened to each other by a sliding contact, the two discs upon overcoming the initial friction can move at different rotational speeds. The friction between the two discs is small relative to the weight of the shopping cart and therefore can be easily overcome. As a result the rolling surfaces 36 of respective guiding rings 35 are not subject to hitherto usual enforced frictions and consequently the wear of the rolling surfaces 36 is reduced.

It will be understood that each of the elements described above, or two or more together, may also find a useful application in other types of constructions differing from the types described above.

While the invention has been illustrated and described as embodied in a specific example of the caster wheel of this invention, it is not intended to be limited to the details shown, since various modifications and structural changes may be made without departing in any way from the spirit of the present invention.

Instead of the aforedescribed pair of interlocking grooves and tongues on the circumference of the caster wheel 19, it is possible to provide one wheel disc with an annular recess having a circular cross-section and the other wheel disc with a corresponding annular tongue having a complementary circular cross section so that both wheel discs are slidably held together when assembled into the caster wheel unit. Similarly, the manner of anchoring the guiding rings 35 in the assigned wheel discs is not limited to the shown examples. In a modification, it is possible to make the guide ring 35 in the form of flat annuli which near the inner circumference have a plurality of apertures so that the guide rings when placed into the same die in which the wheel discs 28 and 29 are formed are firmly connected by the material of the wheel disc in these apertures.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A caster wheel for a transportation apparatus of the type which is adapted for being advanced on a sloping conveyor belt having longitudinally connected guiding grooves and ribs on its upper surface, the caster wheel comprising: a swivel housing; a shaft attached to said housing; two wheel discs slidably connected on their peripheries to form a single wheel unit and each wheel disc being separately supported for rotation about the shaft; and a braking bracket attached to said housing and extending downwardly slightly short of the circumferential level of said wheel disc to abut against the ribs of said conveyor belt when said discs enter into said guiding grooves.

2. The caster wheel as defined in claim 1 wherein said wheel discs have respectively dish-shaped configuration to form together a wheel unit having a torroidal shape.

3. The caster wheel as defined in claim 2 wherein one of said wheel discs has in its central region a tubular projection and the other wheel disc has a complementary projection engaging said tubular projection.

4. The caster wheel as defined in claim 3 wherein the rim portions of respective wheel discs are provided with facing annular grooves and tongues adapted to snap one into the other to provide said sliding connection of said two wheel discs.

5. The caster wheel as defined in claim 1 wherein each of said wheel discs is provided with a radially projecting guiding ring adapted for engaging the longitudinal guiding grooves in said conveyor belt.

6. The caster wheel defined in claim 5 wherein said guiding ring is a separate component part rigidly connected to the assigned wheel disc.

7. The caster wheel as defined in claim 6 wherein the guide ring of each wheel disc is made of a wear-resistant plastic material connected to the corresponding wheel disc by an injection die-casting process.

8. The caster wheel as defined in claim 1 wherein said wheel discs are slidably connected one to another at the central portion of their circumference.

* * * * *